(12) United States Patent
Meier et al.

(10) Patent No.: US 7,841,294 B2
(45) Date of Patent: Nov. 30, 2010

(54) FOOD GLAZING METHOD AND APPARATUS

(75) Inventors: Clifford Todd Meier, South Lyon, MI (US); Michael C. Kosch, Troy, MI (US)

(73) Assignee: Dearborn Sausage Company, Dearborn, MI (US)

( * ) Notice: Subject to any disclaimer, the term of this patent is extended or adjusted under 35 U.S.C. 154(b) by 608 days.

(21) Appl. No.: 11/744,514

(22) Filed: May 4, 2007

(65) Prior Publication Data

US 2007/0259076 A1      Nov. 8, 2007

Related U.S. Application Data

(60) Provisional application No. 60/797,428, filed on May 4, 2006.

(51) Int. Cl.
*B05C 5/04*      (2006.01)

(52) U.S. Cl. .............................. 118/13; 118/16; 118/20; 118/24; 99/494; 99/516

(58) Field of Classification Search .................... 118/13, 118/16, 20, 24; 99/494, 516
See application file for complete search history.

(56) References Cited

U.S. PATENT DOCUMENTS

| | | | | |
|---|---|---|---|---|
| 3,239,379 | A | * | 3/1966 | Von Drachenfe .............. 127/63 |
| 3,439,633 | A | * | 4/1969 | Michalski et al. ............... 425/6 |
| 5,160,377 | A | * | 11/1992 | Montemayor et al. .......... 118/13 |
| 6,513,450 | B1 | | 2/2003 | Gore et al. |
| 6,805,747 | B2 | | 10/2004 | Gore et al. |
| 7,234,586 | B1 | * | 6/2007 | Newman ..................... 198/495 |

\* cited by examiner

*Primary Examiner*—Laura Edwards
(74) *Attorney, Agent, or Firm*—Reising Ethington P.C.

(57) ABSTRACT

A food glazing system for automatically applying a glaze to an edible object. An inclined heatable surface is disposed in the path of sugar dispensed from a sugar dispenser and is positioned to heat the sugar enroute to an edible object to be glazed.

23 Claims, 12 Drawing Sheets

FOOD GLAZING METHOD AND APPARATUS

CROSS REFERENCES TO RELATED APPLICATION

This application claims priority from provisional Application No. 60/797,428, filed May 4, 2006, and entitled "Automatic Glazing Machine", which is incorporated by reference.

TECHNICAL FIELD

This invention relates generally to a food glazing method and apparatus for automatically applying a glaze to a series of edible objects.

INVENTION BACKGROUND

It is known to apply a sugar glaze to a ham by shaking granular sugar onto a ham while directing the flame from a torch onto the falling sugar before it reaches the ham. The heat from the torch flame caramelizes and/or melts the sugar granules as they fall and before they reach the ham.

It is also known to apply a glaze of sugar, spice, and other substances onto a ham by first dispensing melted sugar onto a ham from a reservoir of melted sugar then dispensing spice and other unmelted substances onto the ham's melted sugar coating. U.S. Pat. Nos. 6,513,450 and 6,805,747 each disclose such a system in which sugar is first dispensed onto an inclined plate that is heated to melt the sugar and is positioned to pour the melted sugar into a reservoir. The reservoir is tipped to pour melted sugar onto hams as they're carried along a conveyor beneath the reservoir. A second reservoir dispenses a spice mixture onto the sugar coating before the coating hardens so that the spice mixture will stick to the coating.

What is needed is a method and apparatus for applying sugar or sugar and spice mixture to an edible object or a series of edible objects while providing improved glaze characteristics.

INVENTION SUMMARY

A food glazing apparatus is provided for automatically applying a glaze to an edible object. The apparatus comprises a sugar feed system comprising a sugar dispenser configured to dispense sugar, and an inclined heatable surface disposed in the path of sugar dispensed from the sugar dispenser and positioned to receive and heat the dispensed sugar as the dispensed sugar moves down the inclined heatable surface. The apparatus also comprises an edible object conveyor configured and positioned to serially transport edible objects along an edible object path that intersects the path of sugar falling from the inclined heatable surface such that the sugar forms a glaze on the edible objects as they pass.

BRIEF DESCRIPTION OF THE DRAWINGS

These and other features and advantages of the invention will become apparent to those skilled in the art in connection with the following detailed description, drawings, photographs, and appendices, in which.

DETAILED DESCRIPTION OF INVENTION EMBODIMENT(S)

A first embodiment of a food glazing apparatus for automatically applying a glaze to an edible object is shown at 10 in FIGS. 1-4. A second embodiment of a food glazing apparatus for automatically applying a glaze to an edible object is shown at 10' in FIGS. 5-14. Reference numerals with the designation prime (') in FIGS. 5-14 indicate alternative configurations of elements that also appear in the first embodiment. Unless indicated otherwise, where a portion of the following description uses a reference numeral to refer to FIGS. 1-4, that portion of the description applies equally to elements designated by primed numerals in FIGS. 5-14.

Figures 1, 2A:
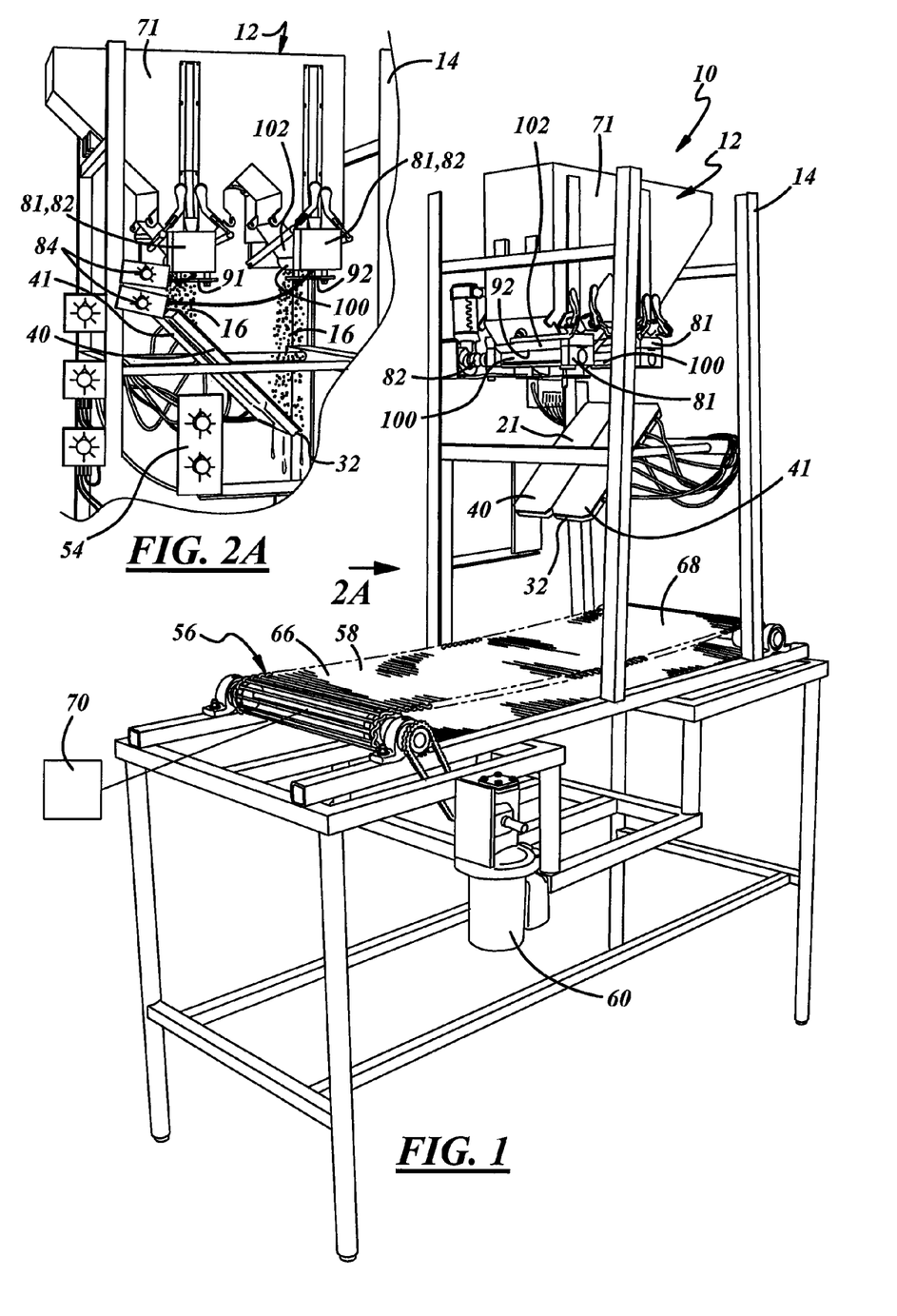
FIG. 1 is a downstream end/back side perspective view of a first embodiment of a food glazing apparatus constructed according to the invention.
FIG. 2A is a partial view of a front side of the apparatus not visible in FIG. 1 or 2.
Figure 2:
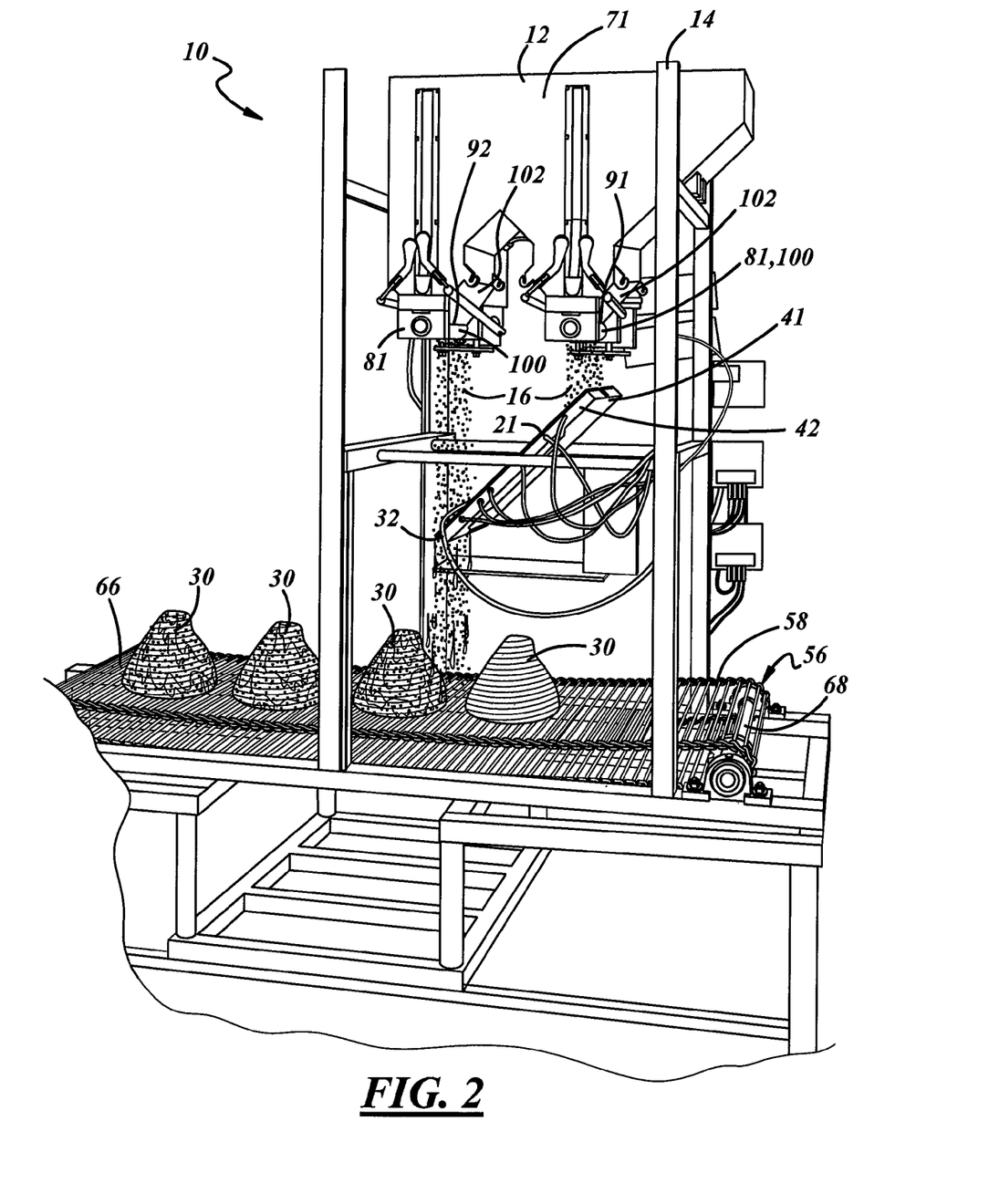
FIG. 2 is a back side perspective view of the glazing apparatus of FIG. 1 showing sugar being sifted onto hot plates of the apparatus and falling in at least partially caramelized form from the hot plates onto hams being transported along a conveyor of the apparatus.

According to the first embodiment, and as shown in FIGS. 1, 2, and 2A, the apparatus 10 may include a sugar and spice mixture feed system comprising a sugar and spice mixture dispenser 12 supported on a glazer frame 14. The dispenser 12 dispenses a mixture 16 including sugar, spices, and other ingredients as shown in FIG. 2. The apparatus 10 may also include an inclined heatable surface 21 disposed in the path of sugar and spice mixture 16 dispensed from the dispenser 12 as shown in FIG. 2. The heatable surface 21 is positioned to heat the sugar and spice mixture 16 en route to an edible object 30 such as a ham.

The heatable surface 21 may be flat and disposed in an inclined attitude relative to earth gravity beneath the sugar and spice mixture dispenser 12 so that sugar falling onto the heatable surface 21 will slide down the heatable surface 21 and at least partially caramelize before falling from a lower edge 32 of the heatable surface 21 onto an edible object 30 positioned or passing below the heatable surface 21 as is, again, best shown in FIG. 2. In the first embodiment the heatable surface 21 is shown to be inclined at an angle of approximately 40-45 degrees relative to earth gravity, but may be positioned at different angles of inclination to obtain different glaze characteristics or to accommodate different applications. The inclination of the heatable surface 21 may be adjustable to allow an operator to vary the speed at which sugar and spice mixture 16 slides along the heatable surface 21, and therefore the amount of heat energy they absorb and the speed at which they leave the heatable surface 21 to fall onto edible objects 30 below, simply by changing the angle of inclination. The temperature of the heatable surface 21 may also be adjustable to allow an operator to vary the amount of heat energy imparted to the sugar and spice mixture 16.

Figure 3:
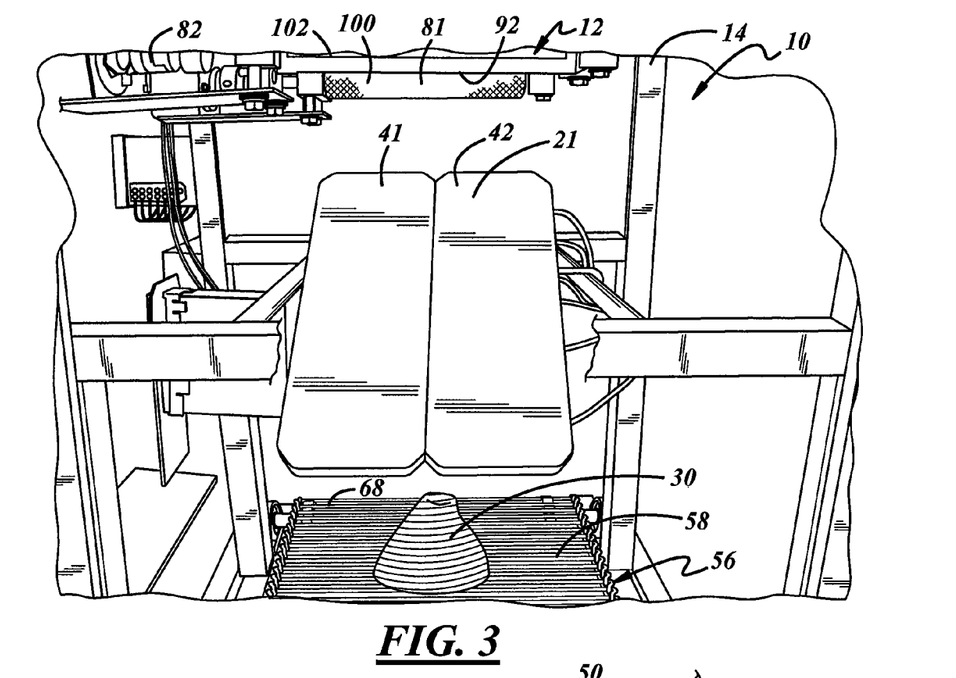
FIG. 3 is a magnified, partially cut-away perspective view from the downstream end of the apparatus showing the hot plates of the apparatus supported in the apparatus above the conveyor.

As best shown in FIG. 3, in the first embodiment the heatable surface 21 comprises the upper surfaces of two heater plates 40, 41 arranged side-by-side and supported on the glazer frame 14 beneath the dispenser 12. The two heater plates 40, 41 may be fabricated from 2 mic 6 cast aluminum precision tooling plates. This type of aluminum is optimized for high conductive heat transfer properties to adjacent materials.

Figure 4:
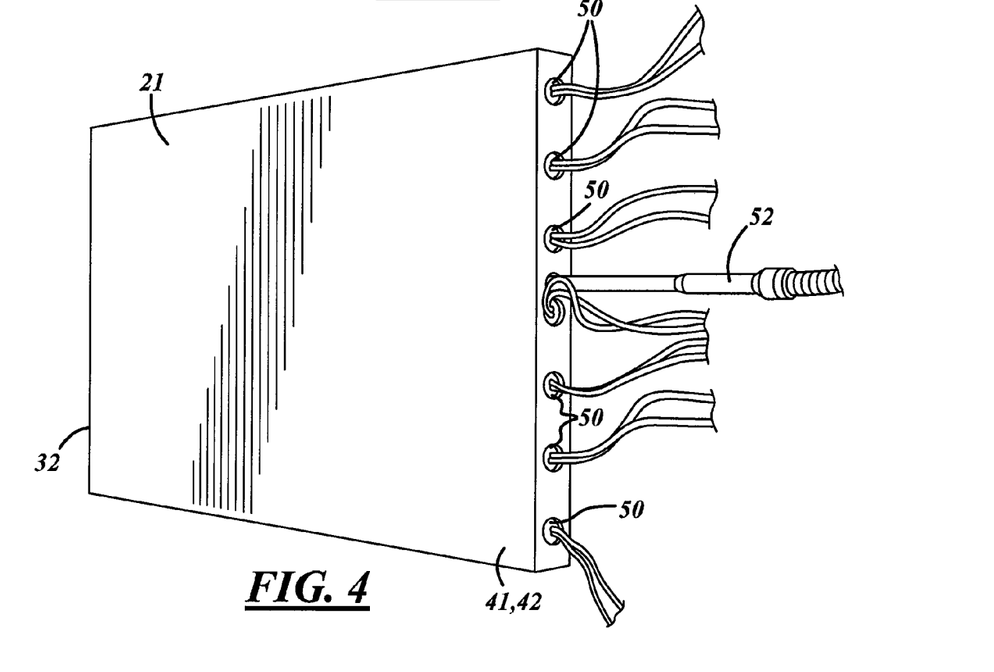
FIG. 4 is an upper end perspective view of an alternative hot plate configuration.

As shown in FIG. 4, seven electric-resistance heater cartridges 50 may be carried within each plate 40, 41 in the first embodiment and are positioned to heat the heatable surface 21. The heater cartridges 50 are connectable to an electrical power source. In other embodiments, a different number of heater cartridges 50 may be used, or, alternatively, any other known suitable means of heating the heatable surface 21 may be employed.

As is also shown in FIG. 4, a temperature sensor in the form of a thermal coupler 52 may be carried by each of the heater plates 40, 41. As shown in FIG. 2A, a temperature controller 54 may be connected to the temperature sensor 52 to obtain and maintain a selected desired temperature of the heatable surface 21 in response to temperature feedback received from the temperature sensor 52. In other embodiments any suitable form of temperature sensor 52 and temperature controller 54 may be used.

An edible object conveyor 56 may be disposed beneath the heatable surface 21 to serially transport edible objects 30 past the heatable surface 21 along an edible object path as shown in FIG. 2 so that the series of edible objects 30 will be showered by sugar, including melted and/or carmelized or partially-carmelized sugar and/or sugar granules and/or partially-melted or partially carmelized sugar granules falling from the heatable surface 21. The edible object conveyor 56 may include a conveyor belt 58 and, as shown in FIG. 1, a conveyor belt drive motor 60 drivingly connected to the conveyor belt 58. As shown in FIG. 2A a conveyor speed controller 62 may be connected to the conveyor drive motor 60 to allow an operator to select and adjust the speed of the edible object conveyor 56.

The apparatus 10 may further include a conveyor belt cleaner (not shown) positioned to clean and sanitize the conveyor belt 58 as the belt 58 runs along a portion of a belt path between an edible object unloading location 66 and an edible object loading location 68. The conveyor belt cleaner 64 may include a water bath.

A cooler 70 may be disposed adjacent the edible object conveyor 56 downstream from the heatable surface 21. The cooler 70 may be operable to cool edible objects 30, after they have been glazed, sufficiently to allow operators to manually remove the objects 30 from the edible object conveyor 56 at the edible object unloading location 66.

The sugar and spice mixture dispenser 12 may include a feed hopper 71 and two rotary sifters 81 as best shown in FIGS. 2 and 2A. The dispenser 12 may be include, for example, Christey Dry Material Depositors, Model #8*D/DE-S available from Christey Machine Company of Fremont, Ohio; and/or sifters constructed according to any one of U.S. Pat. Nos. 4,498,635; 4,595,128; 5,188,262; or 5,516,011; all of which are incorporated herein by reference. The rotary sifters 81 may be supported in respective lower dispenser openings 91, 92 of the feed hopper 71 and may be positioned to sift the contents of the feed hopper 71 onto the heatable surface 21.

The rotary sifters 81 may each include an elongated roller 100 supported generally transverse to the direction of edible object conveyor belt travel to dispense a curtain of sifted sugar onto and across the heatable surface 21 of the heater plates 40, 41. The configuration of the rollers 100 and wiper panels 102 of the rotary sifters 82, 83 may be selected to provide a desired volumetric flow rate of sugar and other ingredients for a given application.

The rotary sifters 81 may include respective electric sifter drive motors 82 operably connected to the roller 100 of each rotary sifter 81. Sifter speed controls 84 may be connected to the respective sifter drive motors 82 to allow an operator to adjust the rate at which sugar and other ingredients are sifted from the feed hopper 71 through each rotary sifter 81.

Because the rotary sifters 81 are spaced apart, they dispense sugar from the feed hopper 71 onto first and second spaced-apart impact areas of the inclined heatable surface 21 of the heater plates 40, 41 as shown in FIG. 2. The second of the two impact areas may be disposed downhill from the first impact area generally in the direction of conveyor travel so that sugar granules falling from the heatable surface 21 after having slid down the heatable surface 21 from the first impact area will be at a more advanced degree of caramelization than sugar granules falling from the heatable surface 21 after having slid down the heatable surface 21 only from the second impact area. This mix of sugar granules at different levels of caramelization results in a desirable glaze consistency.

In practice, a glaze may be automatically applied to a series of edible objects 30 according to the first embodiment by first providing the objects 30 on the edible object conveyor 56, providing sugar and spice mixture 16 in the dispenser feed hopper 71, and causing the edible object conveyor 56 to serially transport the objects 30 past the heatable surface 21 along the edible object path while the dispenser 12 is caused to dispense sugar and spice mixture 16 onto the edible objects 30 by actuating the rotary sifters 81. The sugar and spice mixture 16 is heated en route to the edible objects 30 by heating the heatable surface 21 of the heater plates 40, 41 supported in the paths of the dispensed sugar and spice mixture 16.

The glaze characteristics may be modified by adjusting the rate at which sugar and spice mixture 16 is dispensed onto the first and second impact areas of the heatable surface 21, by adjusting the ratio between the rates at which sugar and spice mixture 16 is dispensed onto the respective first and second impact areas, by adjusting the inclination of the heatable surface 21, by adjusting the temperature of the heatable surface 21, and/or by adjusting the speed of the edible object conveyor 56.

Figure 5:
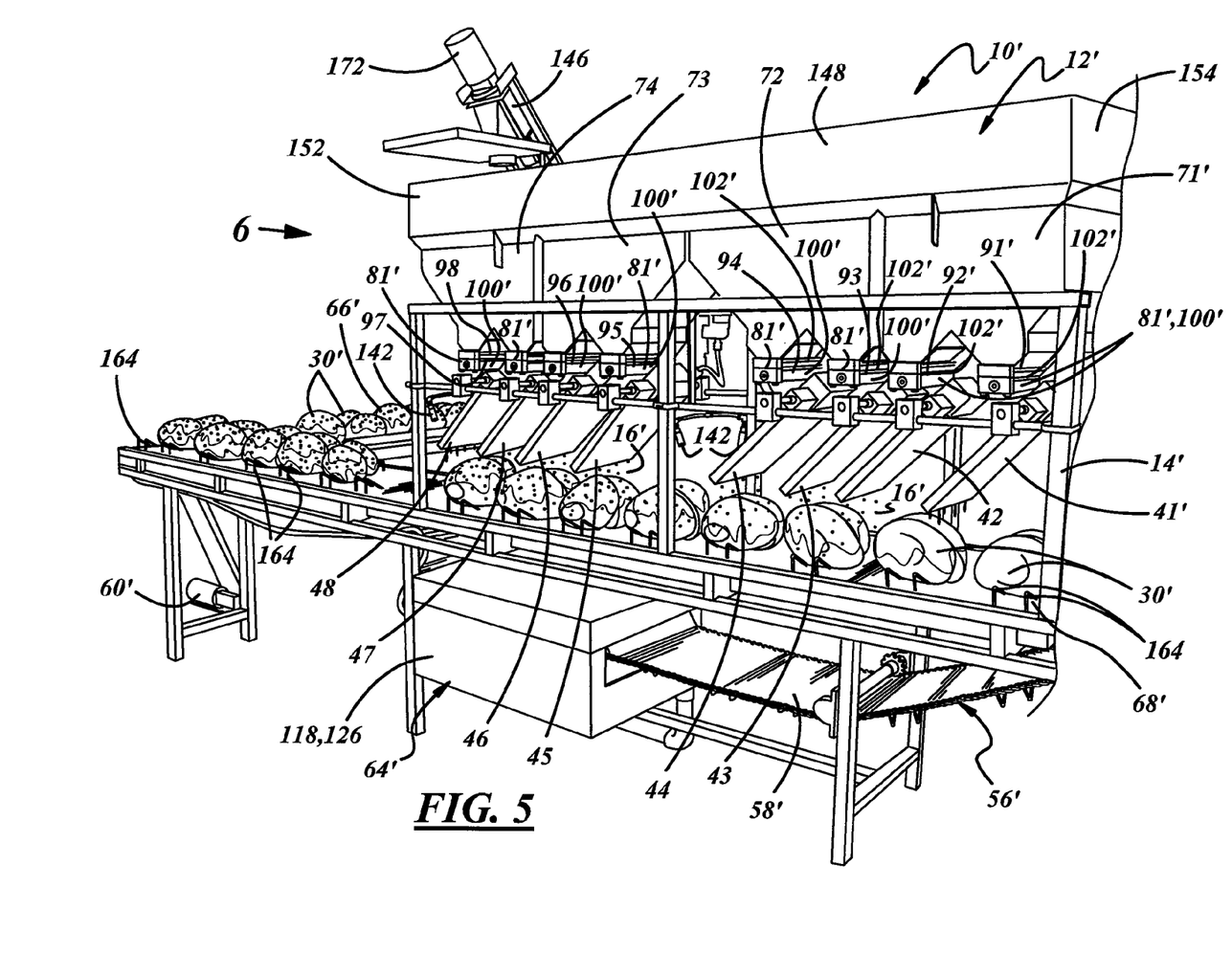
FIG. 5 is a partial front perspective view of a second embodiment of a food glazing apparatus constructed according to the invention.
Figure 6:
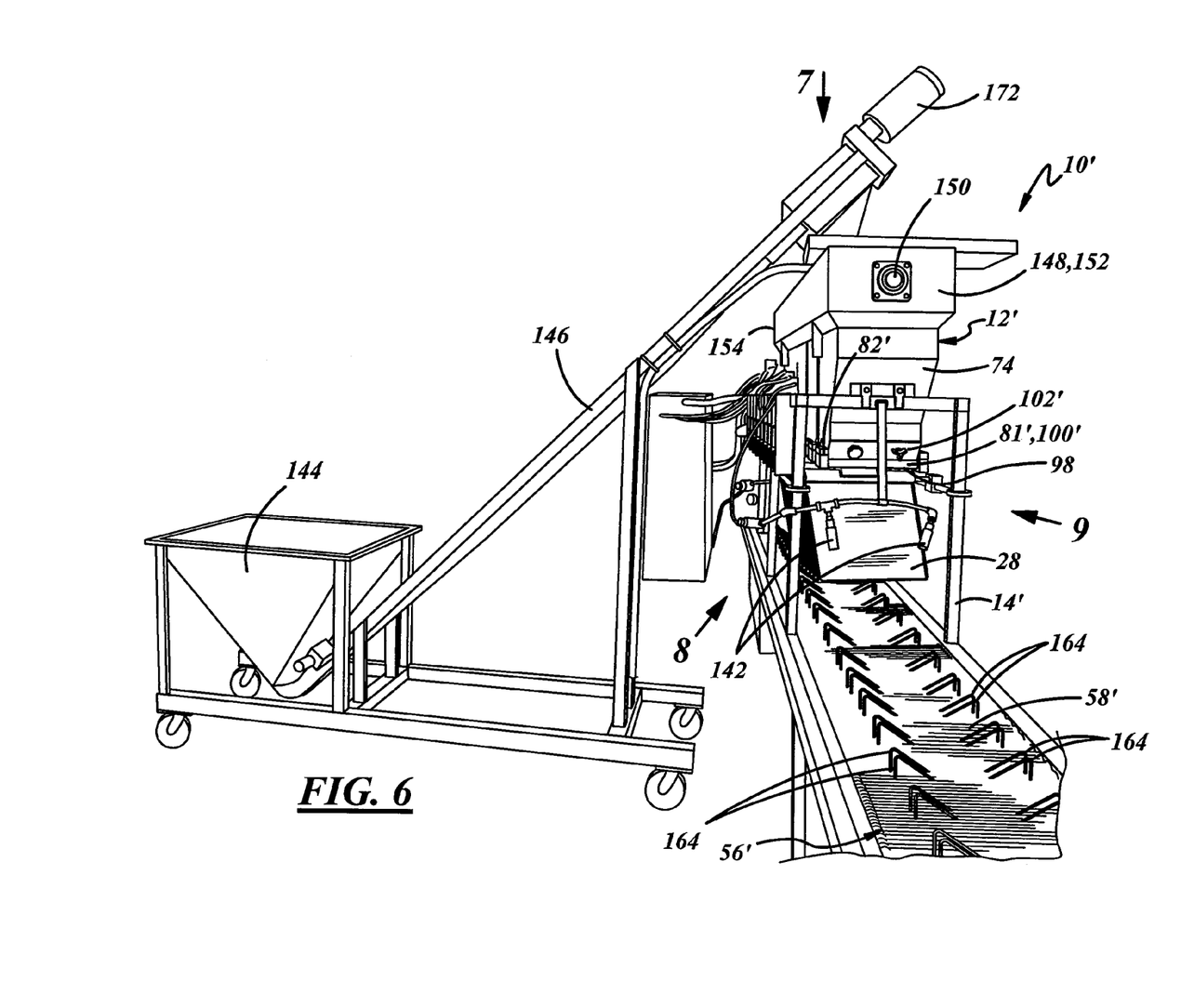
FIG. 6 is a downstream end perspective view of the glazing apparatus of FIG. 5.
Figure 11:
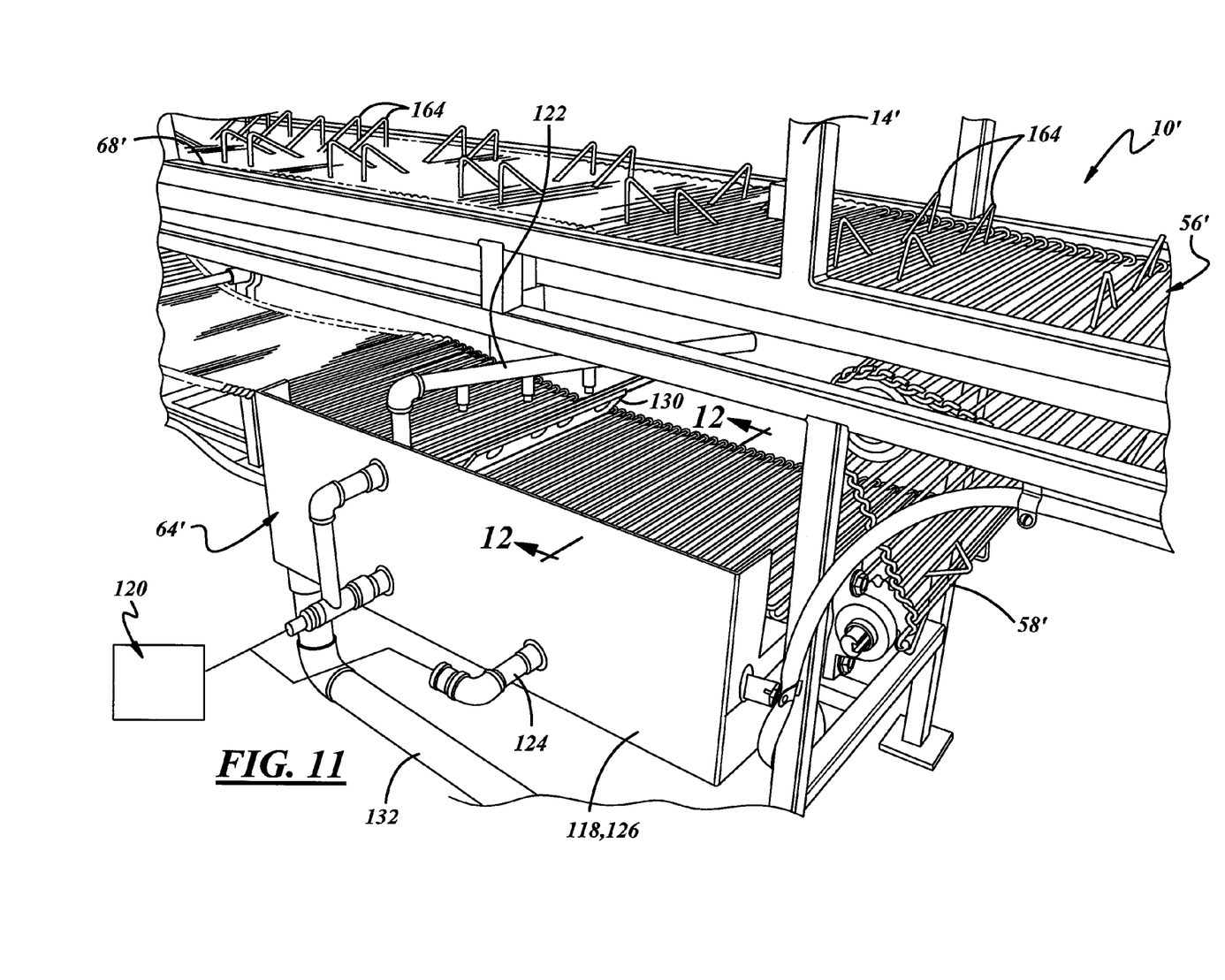
FIG. 11 is a magnified front perspective view of the glazing apparatus of FIGS. 5 and 6 showing a conveyor belt wash station of the apparatus.

According to the second embodiment, and as shown in FIGS. 5-14, the apparatus 10' may include a sugar and spice mixture dispenser 12' comprising four feed hoppers 71', 72, 73, 74 supported in series above a conveyor belt 58' of an edible object conveyor 56' driven by an edible object conveyor drive motor 60', as well as eight heatable surfaces 21', 22-28 of eight heater plates 41', 42-48 disposed in series above the conveyor belt 58' and beneath eight dispenser openings 91', 92', 93-98 in the four feed hoppers 71', 72, 73, 74. This positions the eight heater plates 41', 42-48 directly in the path of sugar and spice mixture streams dispensed from the respective feed hoppers 71', 72, 73, 74 and allows the heater plates to heat the sugar and spice mixture 16' en route to edible objects 30 passing on the edible object conveyor 56' beneath as best shown in FIGS. 5, 6, and 11.

Figures 7, 10, 15:
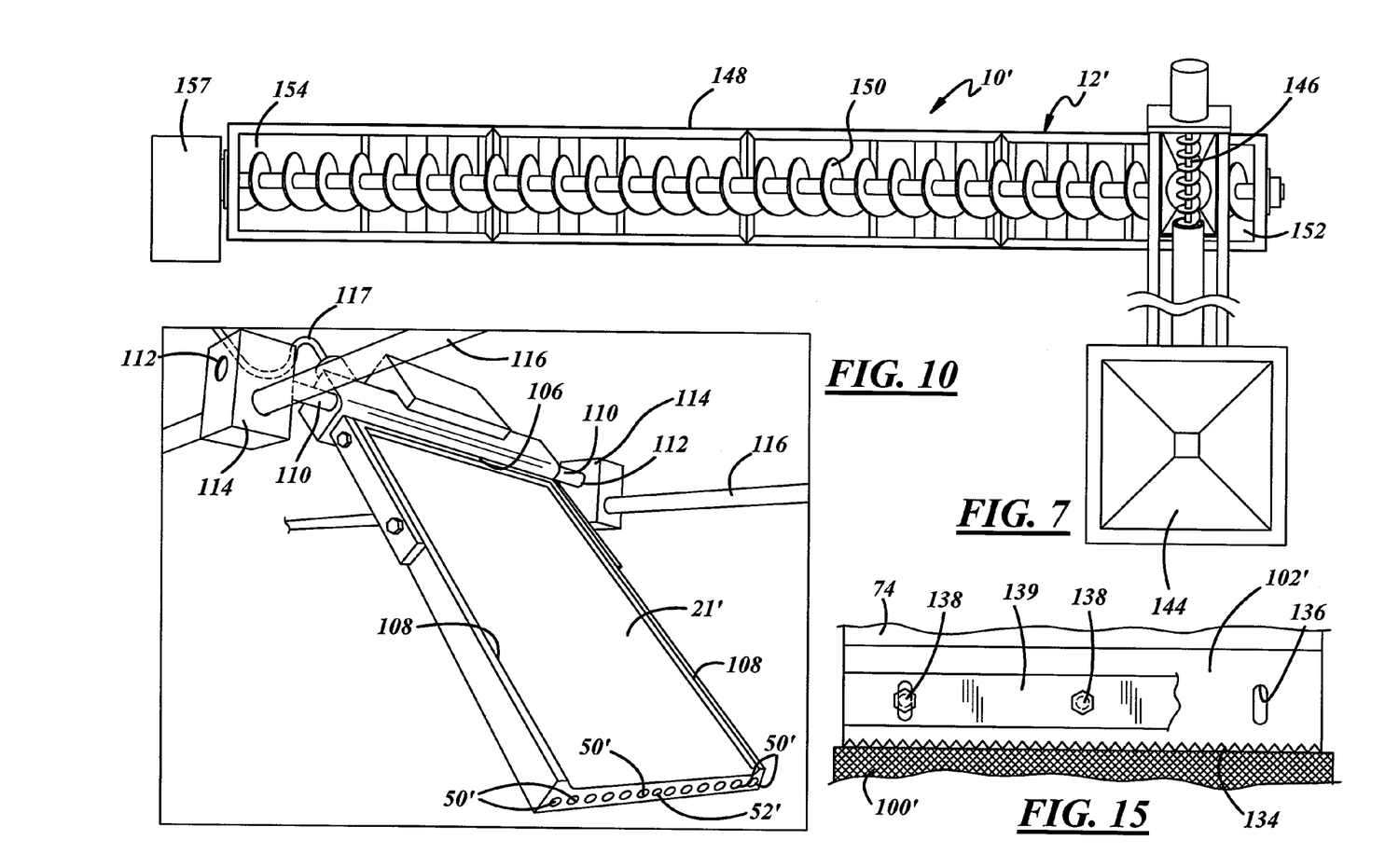
FIG. 7 is a top view of a feed hopper, a tube-housed screw conveyor, and a second screw conveyor housed within a feed trough of the glazing apparatus of FIGS. 5 and 6.
FIG. 10 is a broken-out perspective view of a heater plate of the apparatus of FIGS. 5 and 6 shown pivotably supported on rails of a glazer frame of the apparatus.
FIG. 15 is a magnified view of a wiper panel of one of eight rotary sifters of the apparatus of FIGS. 5 and 6.
Figure 14A:
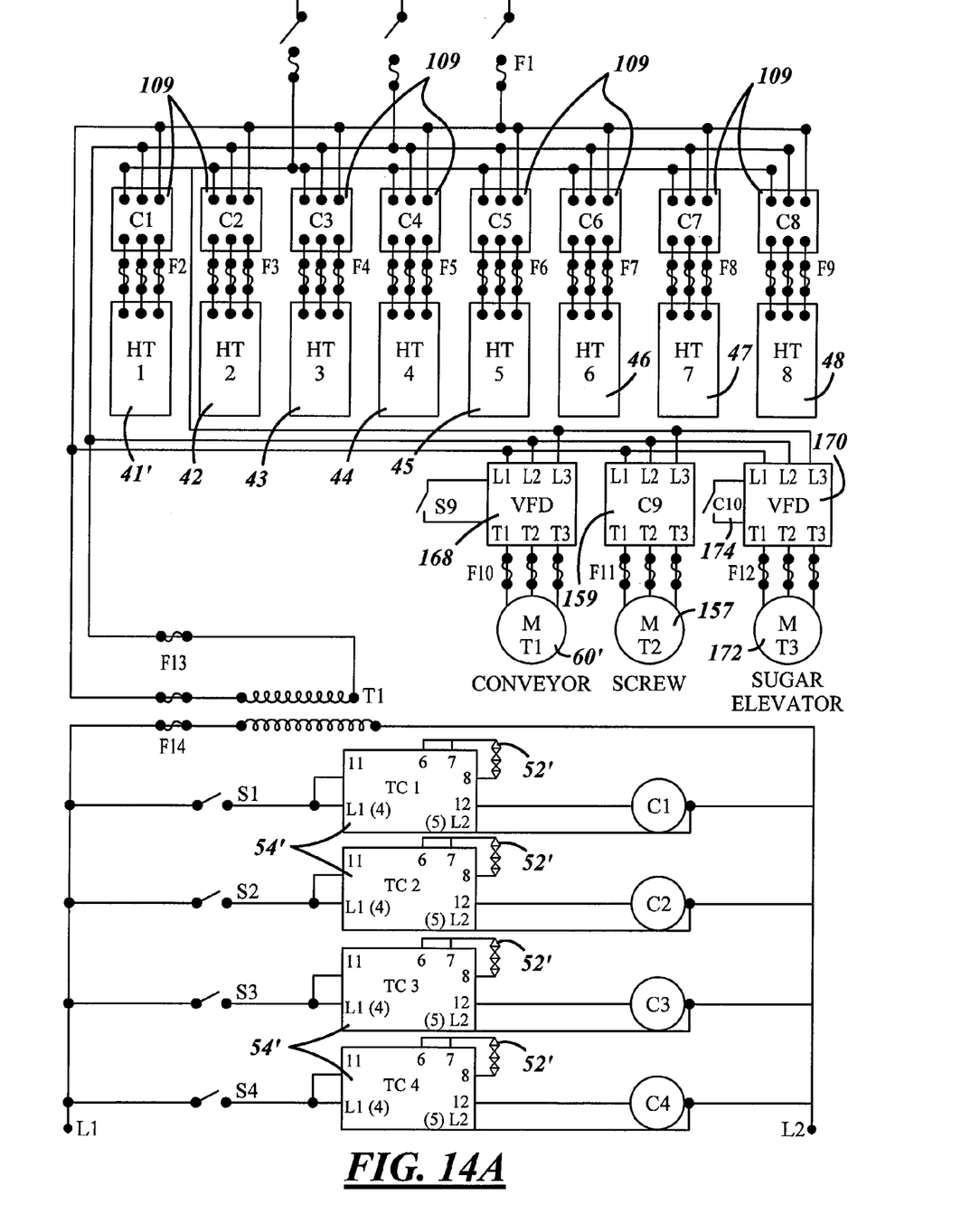
FIG. 14 is a schematic block diagram of electrical circuit elements of the glazing apparatus of FIG. 7.
Figure 14B:
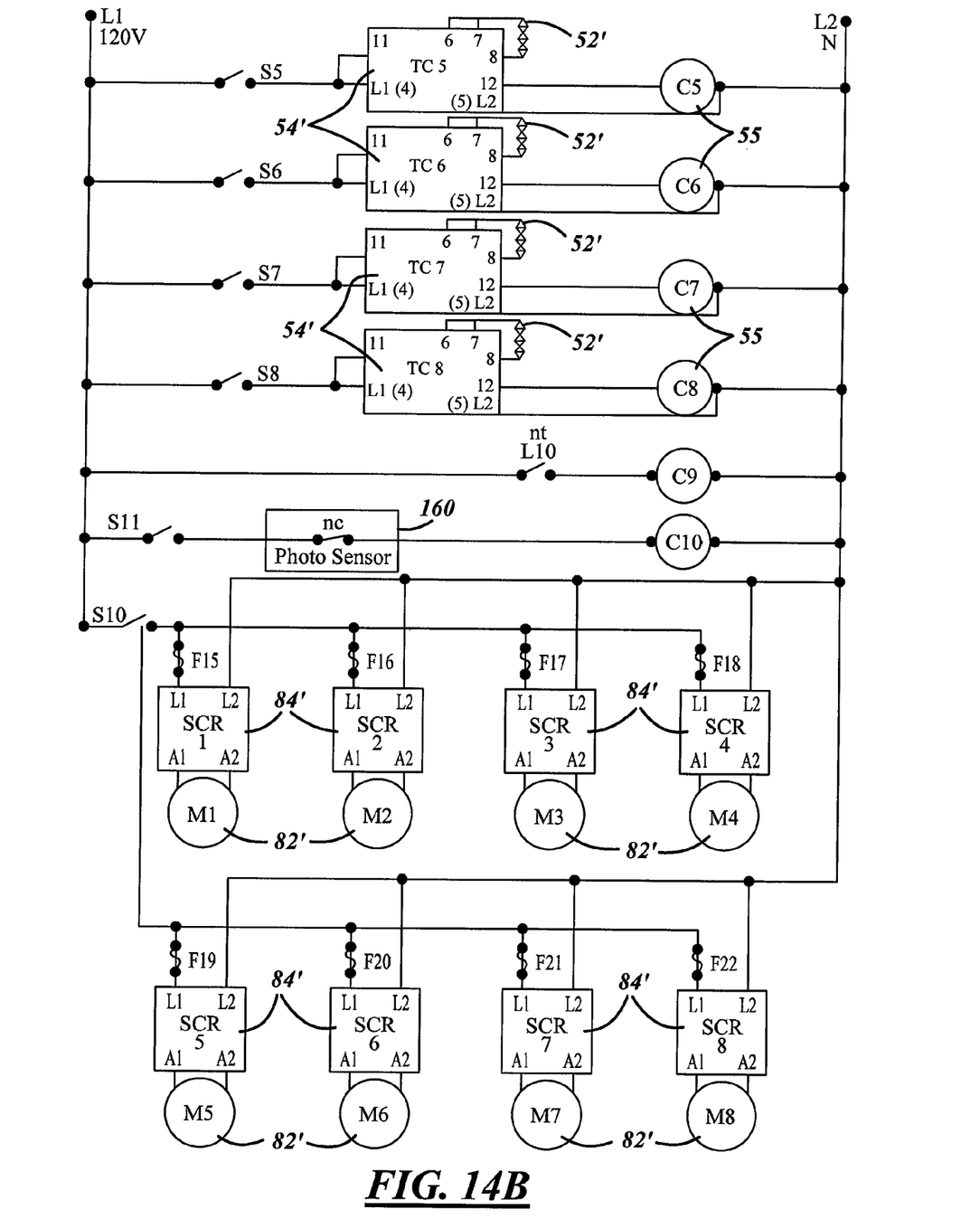

As best shown in FIG. 10, each of the eight heater plates 41', 42-48 includes upper and side edge lips 106, 108 to prevent sugar from falling from upper or side edges of the heater plate. 12 heating elements, which may be in the form of electric-resistance heater cartridges 50', may be carried by and disposed within each of the heater plates 41', 42-48. As in the first embodiment, the cartridges 50' are configured and positioned to heat the heatable surfaces 21', 22-28 and are connectable to an electrical power source. As shown in FIG. 14, the heater plates 41', 42-48 may be energized through respective 3-phase contactors 109. Each heating element 50' may be a CH75758 Hi-Temp Cartridge Heater available from Fast Heat, Inc. of Elmhurst, Ill., which may be modified to include shrink sleeving and a high temperature epoxy seal.

Figure 13:
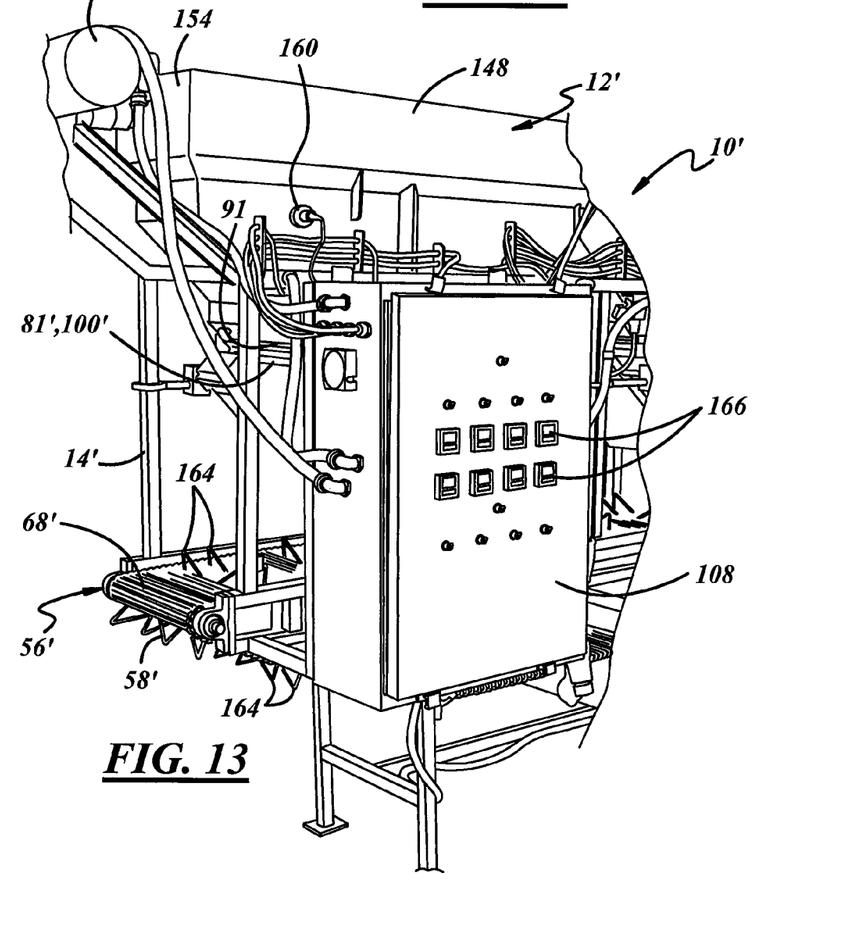
FIG. 13 is a partial perspective view of an upstream end of the apparatus of the apparatus of FIGS. 5 and 6 showing a control box of the apparatus.

A temperature sensor such as a thermal coupler 52' may be carried by each of the heater plates 41', 42-48 as shown in FIG. 10. Separate temperature controllers 54' may be connected to the respective temperature sensors 52' as shown in FIG. 14, so as to obtain and maintain a selected desired temperature of the heatable surfaces 21', 22-28 in response to temperature feedback received from the temperature sensors 52'. The temperature controllers 54' may each be adjustable to maintain the heatable surfaces 21', 22-28 at respective temperatures that will allow sugar to be dispensed from the inclined heatable surfaces without having been melted, e.g., to temperatures in the range of 380 to 390 degrees Fahrenheit. The temperature controllers 54' may be operator adjustable from a glazer control panel 108 as shown in FIG. 13. Coils 55 may be connected to the respective temperature controllers 54', as shown in FIG. 14, to energize contactors within the temperature controllers 54'.

To obtain desired glaze characteristics such as color, consistency, and depth of penetration, and also as required to compensate for variations in ambient room temperature, different ones of the heater plates 41', 42-48 may be maintained at different temperatures. For example, a first upstream heater plate 41' of the heater plates 41', 42-48 may be heated to a temperature that will melt the sugar, e.g., to approximately 410 degrees Fahrenheit, to melt the sugar granules sufficiently to cause the resulting base layer to adhere more securely to the hams passing beneath. Also, melting the sugar may allow the sugar to soak more completely into edible objects 30' passing beneath, i.e., before sugar falling from successive heater plates 42-48 is allowed to form a shell on the edible objects 30'.

The second through $7^{th}$ heater plates 42-47 may be heated to approximately 380-390 degrees Fahrenheit to allow sugar granules to be dispensed from the second through $7^{th}$ heater plates without having been melted, providing a desirable glaze texture on the hams passing beneath. The $8^{th}$ heater plate 48 be heated to aproximately 410 degrees Fahrenheit to give the glaze a golden color when deposited on the surfaces of hams passing beneath.

Figure 8:
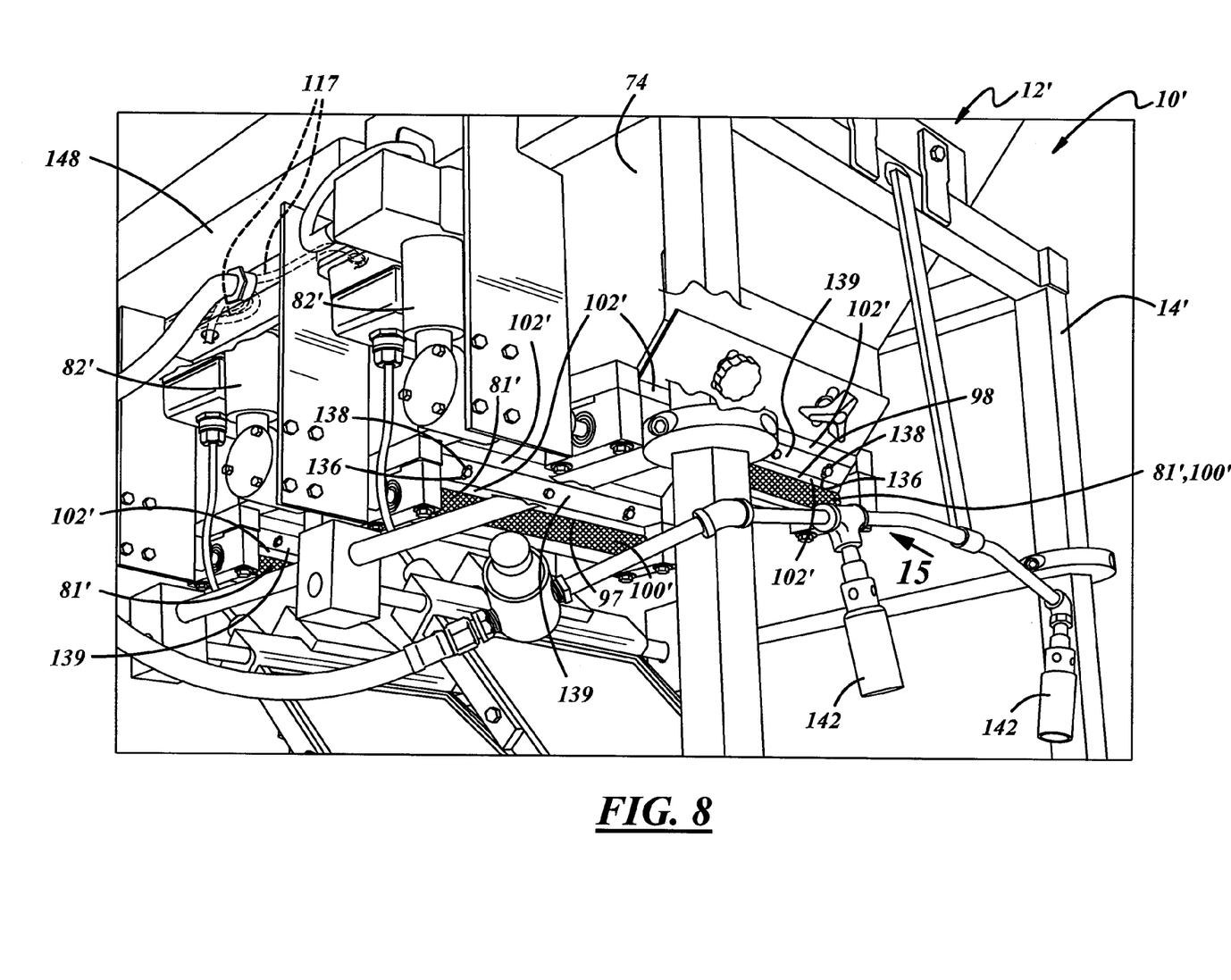
FIG. 8 is a front side/downstream end magnified perspective view of the apparatus of FIGS. 5 and 6 showing a downstream feed hopper, rotary sifter, and torches of the apparatus of FIGS. 5 and 6.
Figure 9:
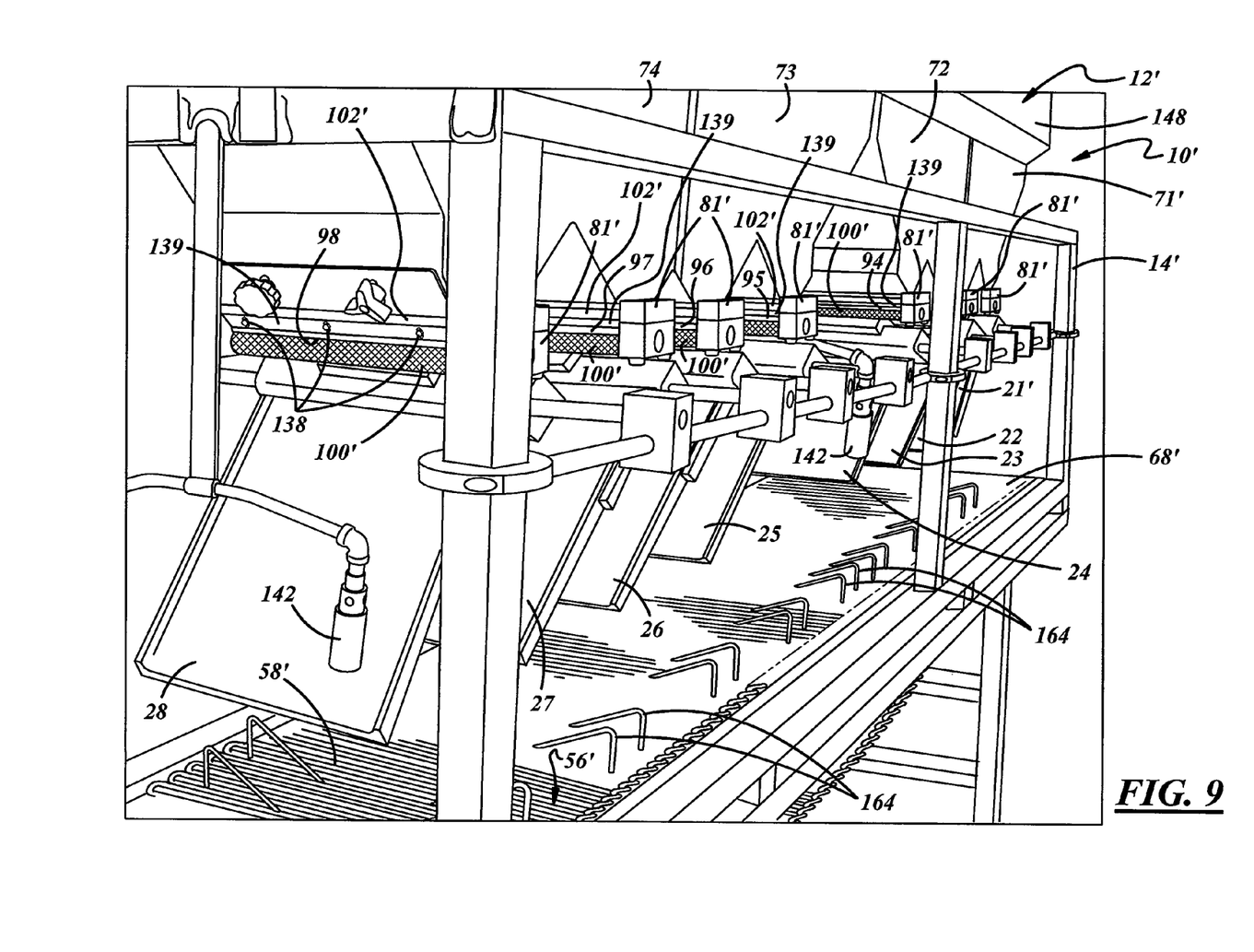
FIG. 9 is a back side/downstream end magnified view of the apparatus of FIGS. 5 and 6.

As best shown in FIG. 10, the heater plates 41', 42-48 may be supported on pivot pins 110 that are pivotably received into pin receiving holes 112 in junction blocks 114 that are slidably supported on parallel rails 116 running the length of a glazer frame 14' to allow for longitudinal position adjustment of the heater plates 41', 42-48 relative to the feed hoppers 71', 72, 73, 74 and generally parallel to the edible object path. The heater plates 41', 42-48 may also be supported by the pivot pins 110 in the junction blocks 114 for individual attitude adjustment in a vertical plane parallel to the edible object path. Although it has been found to be advantageous to orient each of the eight heater plates 41', 42-48 approximately 40 degrees from vertical, to suit other applications, or to achieve other glaze characteristics, it may be preferable to adjust plate inclination to angles other than approximately 40 degrees from vertical. Electrical power supply lines 117 for the heater plates 41', 42-48 may be housed within a structural tube of the sifter frame 14' as shown in FIG. 8. This routing protects the power supply lines 117 and eases glazer cleaning operations by reducing the number of surfaces to be cleaned.

Figure 12:
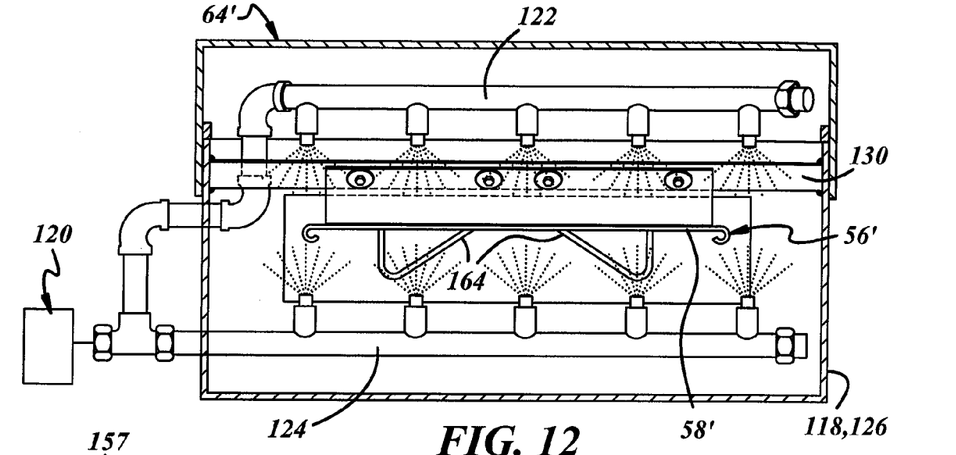
FIG. 12 is an end view of the conveyor belt wash station taken from a downstream end of the apparatus.

A conveyor belt cleaner 64' is positioned at a wash station 118 disposed along a belt return portion of a belt path between an edible object unloading location 66' and an edible object loading location 68' of the apparatus 10'. The wash station 118 includes components configured to clean and sanitize the edible object conveyer belt 58' as the belt runs along the belt return portion of a belt path. The conveyor belt cleaner 64' includes a power washer 120 comprising upper and lower 4-nozzle spray bars 122, 124 supported transversely within an open-topped wash station box 126. Nozzles 128 of the lower spray bar 124 are aimed upward at the conveyor belt 58' from under the conveyor belt return path and the nozzles 128 of the upper spray bar 122 are aimed downward at the conveyor belt 58' from above the conveyor belt return path. The upper spray bar 122 is supported transversely above the conveyor belt return path.

The conveyor belt cleaner 64' also includes a scraper blade 130 disposed within the wash station box 126 in the path of water sprayed from the power washer spray bars 122, 124 in a position to scrape encrusted sugar mixture 16' from the conveyer belt 58'. The scraper blade 130 is positioned just downstream from the power washer spray bars 122, 124. Sugar tailings cleaned from the conveyor belt 58' may be collected in the wash station box 126 and drained from the box 126 through a drain tube 132 and discarded.

As best shown in FIGS. 8 and 15, each of the eight rotary sifters 81' may include a pair of wiper panels 102' adjustably supported in respective positions on opposite forward and aft sides of each of the eight generally rectangular dispenser openings 91', 92', 93-98 of the four feed hoppers 71', 72, 73, 74 (two dispenser openings in each hopper). The wiper panels 102' may be supported such that a serrated edge 134 of each wiper panel 102' is held against a knurled feed roller 100' of each rotary sifter 81 ' to help properly meter the flow of sugar and spice mixture 16' from each feed hopper 71', 72, 73, 74 and/or to prevent the mixture 16' from accumulating on the feed roller 100'. The feed roller and wiper configuration of the rotary sifters 81 ' may be selected to provide a desired volumetric flow rate of sugar and spice mixture 16' for a given application.

The wiper panels 102' may be cut from USDA-approved urethane flat belting having a high resistance to abrasion. As is best shown in FIG. 15, the wiper panels 102' may further include slotted holes 136 through which fasteners 138 may be passed to hold the wiper panels 102' to the feed hoppers 71', 72, 73, 74 and to allow for position adjustment as required to maintain a desired amount of pressure against the rotary sifter feed rollers 100'. A metal panel 139 may be included between each wiper panel 102' and heads of the fasteners 138 to distribute fastener loads. The wiper panels 102' may be removably attached to allow for occasional removal and access to the feed rollers 100' for cleaning.

Each rotary sifter 81' may include a sifter drive motor 82' operably connected to the feed roller 100' of each rotary sifter 81'. Sifter speed control relays 84' may be connected to each of the sifter drive motors 82' as shown in FIG. 14, and may be operator adjustable from the glazer control panel 108 to control the rate at which sugar and other ingredients are sifted from the feed hoppers 71', 72, 73, 74.

As shown in FIGS. 5, 6, 8, and 9, torches 142 may be positioned along the edible object path such that flames produced by the torches 142 are directed at the surface of edible objects 30' moving along the edible object path. In the second embodiment two sets of two torches 142 are positioned just past the first four heater plates 41', 42-44 and just past the final four heater plates 45-48, respectively, to caramelize any sugar granules that land on hams without having been caramelized or melted.

As shown in FIGS. 6 and 7, the feed system may also include a sugar and spice load hopper 144 disposed below and spaced laterally from the feed hoppers 71', 72, 73, 74 on the floor adjacent the glazer frame 14'. Since the load hopper 144 is positioned on the floor it provides for much easier and safer loading of sugar and spice mixture 16'. A diagonally-oriented electric motor-driven tube-housed screw conveyor 146 may be employed to carry sugar and spice mixture 16' from the load hopper 144 into the 4 feed hoppers 71', 72, 73, 74 that, in turn, feed the 8 rotary sifters 81'.

As best shown in FIGS. 5, 6, and 7, the tube-housed screw conveyor 146 may be positioned to deliver sugar from the load hopper 144 to a first end 152 of a an overhead elongated distribution trough 148 that distributes sugar and spice mixture 16' to the four feed hoppers 71', 72, 73, 74. The feed system may also include a second electric motor-driven screw conveyor 150 rotatably supported within and along the length of the distribution trough 148 and operable to carry and distribute sugar and spice mixture 16' along the length of the distribution trough 148 from the first end 152 to a second end 154 of the trough 148. The second screw conveyor 150 may be journaled at each end of the distribution trough 148 in respective end panels 156, 158 of the trough 148. As shown in FIG. 14, a drive motor 157 of the second screw conveyor 150 may be energized through a contactor 159.

A sugar and spice mixture level sensor 160 of any suitable type such as the model U10003 photo sensor available from IFM Efector, Inc. of Exton, Pa., may be disposed about half way down one side of the first, or "upstream" feed hopper 71' disposed below the second end 154 of the trough 148 as shown in FIG. 13. The level sensor 160 detects when sugar mixture level is low enough to actuate the feed system. The spice mixture level sensor 160 may be connected to the feed system via relays and other components, as shown in FIG. 14, in such a way as to automatically actuate the feed system when the sugar mixture level falls below the level of the sensor 160. Accordingly, no electronics or PLCs are required to automate this function although it would be acceptable to do so in other embodiments.

The conveyor belt 58' of the edible object conveyor 56' may be an 18 inch-wide wire or rod-type metal stainless steel belt such as a Sani-Grid® belt available from Cambridge, Inc. of Cambridge, Md., which comprises a plurality of closely-spaced parallel transverse metal T-304 stainless steel 5 gauge belt rods and UBAR-style flights. In the second embodiment such a Sani-Grid® belt has been modified to include a plurality of ham supports spaced along a length of the belt and shaped and positioned to support edible objects 30' such as hams in respective desired positions and attitudes for glazing. The supports comprise laterally opposing pairs of 2 inch-high triangle-shaped flights 164 comprising metal T-304 stainless steel support rods bent and welded to the metal belt rods to form right isosceles triangle shapes as best shown in FIGS. 6 and 11. The rods of each pair of support rods are spaced four belt rods apart longitudinally, are indented 3 inches from belt edges and the pairs of support rods are spaced 9 rods apart longitudinally along the belt and sufficiently far apart laterally to leave a 4½ inch gap between the pairs to receive and support a ham against rolling or otherwise moving out of position on the conveyor belt 58'—even though the ham may have been spiral cut and sliced in half longitudinally.

The control panel 108, located adjacent an upstream end of the glazer apparatus 10' as shown in FIGS. 6 and 13, provides switches for activating the feed system, the edible object conveyor 56', and the power washer 120, controls for modulating edible object conveyor speed, sifter feed roller rotation, and individual heater plate temperatures, and displays 166 for indicating heater plate temperatures. To control conveyor speed, the apparatus 10' may include a variable frequency drive 168 connected to the conveyor drive motor 60' as shown in FIG. 14. With regard to feed system control, and as is also shown in FIG. 14, the speed of the tube-housed screw conveyor 146 may be controlled by a second variable frequency drive 170 connected to a drive motor 172 of the tube-housed screw conveyor 146. The actuation of the tube-housed screw conveyor 146 is accomplished by a normally-open relay 174 that closes when the photo sensor 160 detects that the level of sugar and spice mixture has fallen below the level of the sensor 160.

In practice, glaze may be applied to an edible object 30' or a series of edible objects 30' according to the second embodiment by first supporting the edible object conveyor 56' beneath the heater plates 41', 42-48 in a position where sugar and spice mixture 16' falling from the heatable surfaces 21', 22-28 of the heater plates 41', 42-48 will land on the edible objects 30' as the edible object conveyor 56' serially transports the edible objects 30' past the heater plates 41', 42-48 along the edible object path. The plates are heated, the feed system is activated, and a plurality of edible objects 30' are provided via the edible object conveyor 56'.

Desired glaze characteristics may be obtained by adjusting the speed of the edible object conveyor 56', adjusting the number of feed hoppers 71', 72, 73, 74, sifters 81', and heatable surfaces 21', 22-28 from which heated sugar is dispensed onto an edible object 30' passing beneath the heatable surfaces 21', 22-28, by adjusting the temperatures of the heatable surfaces 21', 22-28, by adjusting the inclination angles of the heatable surfaces 21', 22-28, and/or by maintaining at least one of the heatable surfaces 21', 22-28 at a temperature different from the other heatable surfaces 21', 22-28. Glaze adhesion to the edible object 30' may be improved by heating at least one of the first few upstream heatable surfaces 21', 22-33 to a temperature sufficient to melt the sugar. A golden glaze color may be provided by heating at least one of the final few downstream heatable surfaces 24-28 to a temperature sufficient to melt the sugar. A desired texture may be provided by heating at least one of the heatable surfaces 21', 22-28 to a temperature sufficient to dispense sugar from the at least one surface without having been melted. For example, the temperature of a first upstream heatable surface 21' of the heatable surfaces 21', 22-28 may be adjusted to approximately 410 degrees Fahrenheit, the temperatures of each of second, third, fourth, fifth, and sixth heatable surfaces 22-26 downstream of the first surface 21' may be adjusted to a temperature in the range of approximately 380 to 390 degrees Fahrenheit, and the temperature of a final eighth downstream surface 28 may be adjusted to approximately 410 degrees Fahrenheit.

This description, rather than describing limitations of an invention, only illustrates (an) embodiment(s) of the invention recited in the claims. The language of this description is therefore exclusively descriptive and is non-limiting.

Obviously, it's possible to modify this invention from what the description teaches. Within the scope of the claims, one may practice the invention other than as described above.

What is claimed is:

1. A food glazing apparatus for automatically applying a glaze to an edible object, the apparatus comprising:
   a sugar feed system comprising a sugar dispenser configured to dispense sugar;
   an inclined heatable surface disposed in the path of sugar dispensed from the sugar dispenser and positioned to receive and heat the dispensed sugar as the dispensed sugar moves down the inclined heatable surface; and
   an edible object conveyor configured and positioned to serially transport edible objects along an edible object path that intersects the path of sugar falling from the inclined heatable surface such that the sugar forms a glaze on the edible objects as they pass;
   the sugar dispenser including a plurality of feed hoppers supported in series above the edible object conveyor; and
   at least one heatable surface being disposed in the path of sugar dispensed from at least one of the respective feed hoppers of the plurality of feed hoppers and positioned to heat the sugar enroute to falling from the heatable surface onto edible objects passing on the edible object conveyor beneath.

2. A food glazing apparatus as defined in claim 1 configured to dispense both sugar and other ingredients onto edible objects via the inclined heatable surface in a single stream.

3. A food glazing apparatus as defined in claim 1 in which the heatable surface is inclined at an angle of approximately 40 degrees relative to earth gravity.

4. A food glazing apparatus as defined in claim 1 in which the apparatus further includes a heater plate comprising the heatable surface.

5. A food glazing apparatus as defined in claim 4 in which at least one electric-resistance heater is carried by the heater plate and is configured and positioned to heat the heatable surface.

6. A food glazing apparatus as defined in claim 4 in which the apparatus further includes:
   a temperature sensor carried by the heater plate; and
   a temperature controller connected to the temperature sensor and configured to obtain and maintain a desired temperature of the heatable surface in response to temperature feedback received from the temperature sensor.

7. A food glazing apparatus as defined in claim 6 in which the temperature controller is configured to maintain the heatable surface at a selected desired temperature that will allow sugar to be dispensed from the heatable surface without having been melted.

8. A food glazing apparatus as defined in claim 7 in which the temperature controller is configured to maintain the heatable surface at an operator-selected temperature in the approximate range of 380 to 390 degrees Fahrenheit.

9. A food glazing apparatus as defined in claim 1 in which the conveyor includes a conveyor cleaner comprising a power washer having nozzles positioned to clean a belt of the conveyor.

10. A food glazing apparatus as defined in claim 9 in which the conveyor cleaner includes a scraper blade disposed in a position to scrape encrusted sugar from the conveyor belt.

11. A food glazing apparatus as defined in claim 1 in which the sugar dispenser includes a rotary sifter supported adjacent at least one of the respective feed hoppers of the plurality of feed hoppers and configured and positioned to sift the contents of the at least one feed hopper onto the heatable surface.

12. A food glazing apparatus as defined in claim 11 in which the rotary sifter includes a wiper panel supported on the at least one feed hopper such that an edge of the wiper panel is held against a feed roller of the rotary sifter.

13. A food glazing apparatus as defined in claim 12 in which:
   the rotary sifter includes a sifter drive motor operably connected to the feed roller of the rotary sifter; and
   the apparatus includes a sifter speed control connected to the sifter drive motor and configured to allow an operator to adjust the rate at which sugar is sifted from the hopper.

14. A food glazing apparatus as defined in claim 1 in which the apparatus includes a plurality of heatable surfaces disposed in the respective paths of sugar dispensed from respective feed hoppers of the plurality of feed hoppers and are positioned to heat the sugar enroute to falling from the plurality of heatable surfaces onto edible objects passing on the edible object conveyor beneath.

15. A food glazing apparatus as defined in claim 14 in which each of the heatable surfaces is oriented approximately 40 degrees from vertical.

16. A food glazing apparatus as defined in claim 14 in which the feed system includes:
   a load hopper disposed below and spaced laterally from the feed hoppers; and
   a sugar conveyor configured to carry sugar from the load hopper into the feed hoppers.

17. A food glazing apparatus as defined in claim 16 in which:
   the sugar conveyor is configured to deliver sugar from the load hopper to one end of a distribution trough that distributes sugar to the feed hoppers; and
   the apparatus includes a second sugar conveyor supported within and along the length of the distribution trough and configured to carry and distribute sugar along the length of the distribution trough.

18. A food glazing apparatus as defined in claim 16 in which a sugar level sensor is disposed in one of the feed hoppers and is configured to detect when sugar mixture level drops below a predetermined minimum level.

19. A food glazing apparatus as defined in claim 1 in which the conveyor includes:
   a metal belt comprising a plurality of closely-spaced parallel transverse metal belt rods; and
   a plurality of supports spaced along a length of the belt and configured to support edible objects in respective desired positions and attitudes for glazing.

20. A food glazing apparatus as defined in claim 14 in which at least one of the heatable surfaces has a temperature different from the other heatable surfaces.

21. A food glazing apparatus as defined in claim 20 in which a first upstream heatable surface has a temperature higher than at least one of the other heatable surfaces and sufficient to melt the sugar granules sufficiently to form a more adhesive base layer on edible objects passing beneath.

22. A food glazing apparatus as defined in claim 21 in which at least one of the heatable surfaces has a temperature lower than the first upstream heatable surface and selected to provide a desirable glaze texture on edible objects passing beneath.

23. A food glazing apparatus as defined in claim 22 in which the first upstream heatable surface has a temperature of approximately 410 degrees Fahrenheit and at least one of the other heatable surfaces has a temperature in the range of approximately 380-390 degrees Fahrenheit.

* * * * *